Nov. 19, 1957 A. F. WELLING 2,813,633

HOLDER FOR MAGNETIC TAPE REELS

Filed Oct. 8, 1954

INVENTOR.
ALVIN F. WELLING
BY

McMorrow, Berman + Davidson
ATTORNEYS

United States Patent Office 2,813,633

Patented Nov. 19, 1957

2,813,633

HOLDER FOR MAGNETIC TAPE REELS

Alvin F. Welling, Millbury, Ohio

Application October 8, 1954, Serial No. 461,140

1 Claim. (Cl. 211—41)

This invention relates to racks for sound records, and more particularly to an improved holder for magnetic tape reels.

A main object of the invention is to provide a novel and improved holder for reels of magnetic recording tape, said holder being simple in construction, being neat in appearance, and providing a means for safely storing magnetic tape recordings.

A further object of the invention is to provide an improved holder for magnetic tape recordings, said holder being inexpensive to manufacture, being durable in construction, having a large capacity, and being easy to transport.

Further objects and advantages of the invention will become apparent from the following description and claim, and from the accompanying drawings, wherein:

Figures 1, 2, 3:
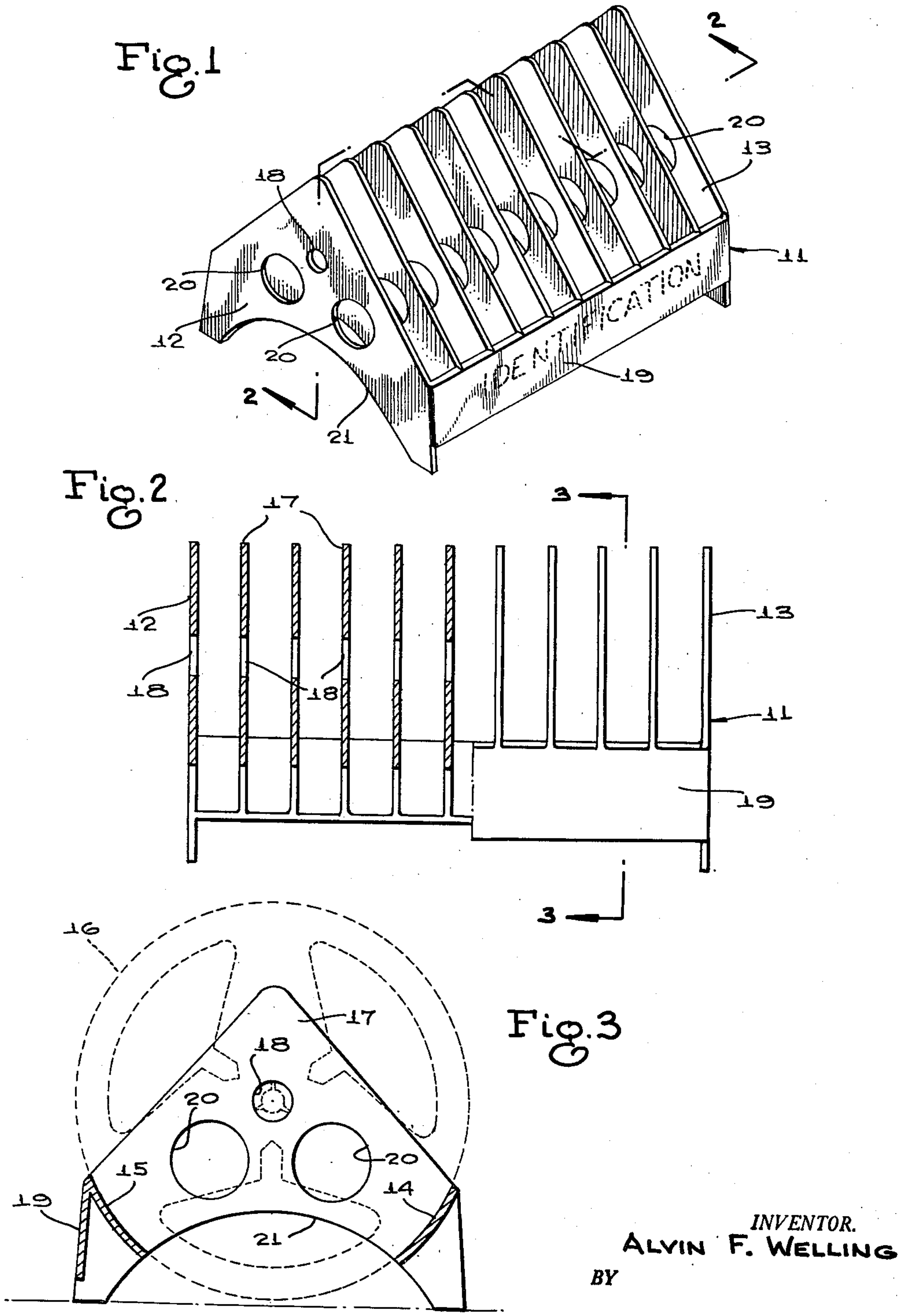
Figure 1 is a perspective view of an improved holder for magnetic tape reels constructed in accordance with the present invention.
Figure 2 is a longitudinal vertical cross sectional view taken on the line 2—2 of Figure 1.
Figure 3 is a transverse vertical cross sectional view taken on the line 3—3 of Figure 2.

Referring to the drawings, the improved holder for magnetic tape reels is designated generally at 11 and comprises a pair of end walls 12 and 13 which are rigidly connected at their lower portions by the respective front and rear longitudinal members 14 and 15. As shown, the longitudinal members 14 and 15 are arcuate in transverse cross section and have a common axis of curvature. As shown in Figure 3, the longitudinal members 14 and 15 are located so as to supportingly receive reels of magnetic tape, such as the reel 16 shown in dotted view in Figure 3, to support the reels in transverse upright positions.

Designated at 17 are a plurality of upstanding partition members rigidly secured to the front and rear longitudinal members 14 and 15 parallel to the end walls 12 and 13, said partition walls 17 being located between the end walls 12 and 13 and being uniformly spaced to receive magnetic tape reels 16 therebetween.

The end walls 12 and 13 and the partition walls 17 are formed with longitudinally aligned apertures 18 located on the axis of curvature of the longitudinal reel-supporting elements 14 and 15, whereby the apertures 18 register with the center openings of tape reels 16 supported between the partition members 17, or supported between the end walls 12 and 13 and the inwardly adjacent partition members 17, on the members 14 and 15 in the manner illustrated in Figure 3. Thus, a rod member, such as a pencil or the like may be inserted through the registering apertures 18 and the center openings of the tape reels, whereby the rack 11 and the reels positioned therein may be readily lifted and transported without risk of dropping the reels therefrom.

Designated at 19 is a longitudinally extending depending identification plate rigidly secured to the front edges of the lower portions of the end walls 12 and 13 and to the top edge of the front longitudinal member 15, as shown in Figure 3, the plate member 19 being suitable for use in carrying identification of the respective reels supported adjacent the respective partition members 17 of the rack device.

In order to lighten the structure, the end walls 12 and 13 and the partition members 17 are formed with additional apertures 20, and the end walls and partition members are formed with the large bottom arcuate notches 21.

The end walls 12 and 13 and the partition members 17 are of identical shape, and may be of any desired shape. For example, they may have the generally upwardly tapering triangular shape illustrated in the drawings.

The device may be formed of any suitable material, such as plastic or the like, and is preferably formed with its various parts integral with one another.

While a specific embodiment of an improved holder for magnetic tape reels has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A holder for magnetic tape reels comprising a pair of generally rectangular, relatively thin rigid end walls, respective front and rear longitudinal plate members rigidly connecting the lower portions of said end walls at opposite side margins thereof, said plate members being inclined upwardly and outwardly, being arcuately upwardly concave in transverse cross section, and having a common axis of curvature, and a plurality of upstanding relatively thin rigid partition members rigidly secured to said front and rear longitudinal members parallel to said end walls and spaced to receive magnetic tape reels therebetween, said partition members being identical in shape to the upper portions of said end walls and being longitudinally aligned therewith, said end walls and partition members being formed on said common axis of curvature with longitudinally aligned identical apertures, said plate members being adapted to transversely support tape reels of common radius therewith adjacent the partition members, whereby said apertures register with the center holes of the tape reels, and whereby a carrier rod may be at times engaged longitudinally through the apertures and tape reel center holes.

References Cited in the file of this patent

UNITED STATES PATENTS

| | | |
|---|---|---|
| D. 114,637 | Heil | May 9, 1939 |
| 1,402,332 | Wiehl | Jan. 3, 1922 |
| 1,619,420 | Hoth | Mar. 1, 1927 |
| 2,314,557 | Rosenfeld | Mar. 23, 1943 |

FOREIGN PATENTS

| | | |
|---|---|---|
| 37,434 | Sweden | Aug. 26, 1914 |